(12) United States Patent
Sonderegger et al.

(10) Patent No.: US 8,579,332 B2
(45) Date of Patent: Nov. 12, 2013

(54) TANK ARRANGEMENT AND VEHICLE WITH A TANK ARRANGEMENT

(75) Inventors: Sigurd Sonderegger, Askim (SE); Anders Ivarsson, Torslanda (SE)

(73) Assignee: Volvo Lastvagner AB, Göteborg (SE)

( * ) Notice: Subject to any disclaimer, the term of this patent is extended or adjusted under 35 U.S.C. 154(b) by 15 days.

(21) Appl. No.: 13/139,301

(22) PCT Filed: Dec. 12, 2008

(86) PCT No.: PCT/SE2008/000701
§ 371 (c)(1),
(2), (4) Date: Jul. 7, 2011

(87) PCT Pub. No.: WO2010/068149
PCT Pub. Date: Jun. 17, 2010

(65) Prior Publication Data
US 2012/0139225 A1  Jun. 7, 2012

(51) Int. Cl.
*B60K 15/06* (2006.01)
(52) U.S. Cl.
USPC ............ 280/834; 123/514; 137/571; 137/572
(58) Field of Classification Search
USPC .................... 280/834; 123/514; 137/571, 572
See application file for complete search history.

(56) References Cited

U.S. PATENT DOCUMENTS

| | | | | |
|---|---|---|---|---|
| 3,981,321 A * | 9/1976 | Risse et al. | | 137/255 |
| 4,288,086 A | 9/1981 | Oban et al. | | |
| 4,930,537 A | 6/1990 | Farmer | | |
| 5,020,566 A * | 6/1991 | Shoop | | 137/265 |
| 5,197,443 A * | 3/1993 | Hodgkins | | 123/514 |
| 5,360,034 A * | 11/1994 | Der Manuelian | | 137/571 |
| 5,983,932 A * | 11/1999 | Wagner et al. | | 137/587 |
| 6,382,225 B1 * | 5/2002 | Tipton | | 137/1 |
| 6,792,966 B2 * | 9/2004 | Harvey | | 137/265 |
| 6,799,562 B2 * | 10/2004 | Pratt et al. | | 123/514 |
| 6,845,782 B2 * | 1/2005 | Osterkil et al. | | 137/1 |
| 7,182,071 B2 * | 2/2007 | Hansson | | 123/514 |
| 2002/0148510 A1 | 10/2002 | Viebahn et al. | | |
| 2005/0087236 A1 | 4/2005 | Woo | | |

FOREIGN PATENT DOCUMENTS

WO    2008105721 A1    9/2008

OTHER PUBLICATIONS

International Search Report for corresponding International Application PCT/SE2008/000701.

* cited by examiner

*Primary Examiner* — Kevin Hurley
*Assistant Examiner* — Michael Stabley
(74) *Attorney, Agent, or Firm* — WRB-IP LLP

(57) ABSTRACT

A tank arrangement for a vehicle, particularly a truck, includes at least a first fuel tank and a second fuel tank which are connected by a balancing pipe, a suction pipe for feeding fuel to an engine and a return pipe for feeding fuel from the engine to at least one of the fuel tanks. The balancing pipe is provided with a first end to supply fuel to the first tank and a second end to suck fuel from the second tan, wherein a check valve is arranged upstream of the return pipe in the balancing pipe between the at least two tanks allowing a flow direction from the second tank to the first tank and blocking a flow in the reverse direction. Suction of fuel to the engine is from the first tank only. The check valve provides an automatic purging of the system.

15 Claims, 6 Drawing Sheets

TANK ARRANGEMENT AND VEHICLE WITH A TANK ARRANGEMENT

BACKGROUND AND SUMMARY

The invention relates to a tank arrangement and a vehicle with a tank arrangement.

U.S. Pat. No. 4,930,537 discloses a fuel utilization system for a truck having multiple tanks, an above-tank crossover pipe coupling the two tanks. A suction pipe is coupled to a primary tank only. A return pipe is coupled to the crossover pipe.

As an alternative the return pipe can be coupled directly to the primary tank. This method of transferring liquid between the tanks used in this system is commonly known as siphoning. A Venturi device is arranged inside the tank which is flushed when the tank is completely filled.

It is known in the art to use dual tanks for supplying fuel to an engine of a truck. On one hand customers are desirous to have a big tank volume available, on the other hand construction space is very restricted particularly in trucks. As space restrictions do not allow to install one big tank, the tank volume is split in two tanks, e.g. a big master tank and a small slave tank, mounted e.g. on both sides of the frame. The piping between the tanks and the connections to the engine are complex and costly. Often, at least one of the tanks cannot be completely depleted, and refilling of the tanks has to be done in a certain order, i.e. one specific tank has to be filled before the other tank can be filled.

It is desirable to provide a tank arrangement which allows for a better fuel use up and an economic piping between the tanks and the engine. It is also desirable to provide a vehicle with a tank arrangement with a robust level balancing system.

According to a first aspect of the invention, a tank arrangement for a vehicle, particularly a truck, is proposed, comprising at least a first fuel tank and a second fuel tank which are connected by a balancing pipe, a suction pipe for feeding fuel to an engine and a return pipe for feeding fuel from the engine to at least one of the fuel tanks. The balancing pipe is provided with a first end to supply fuel to the first tank and a second end to suck fuel out of the second tank, wherein a check valve is arranged upstream of the return pipe in the balancing pipe between the at least two tanks allowing a flow direction from the second tank to the first tank and blocking a flow in the reverse direction.

Advantageously, the check valve provides an automatic purging function to remove air from the balancing pipe between the first and the second tank. Preferably, the check valve exhibits a low opening pressure corresponding to not more than 100 mm fuel height difference, particularly not more than 500 Pa.

Favourably, the tank arrangement allows for complete emptying of both the master and the slave tank. Of course, more than two tanks can be provided, e.g. one master tank with two or more slave tanks. The suction point of the slave tank can be lowered to the tank bottom which provides a better fuel use up. A specific refilling order is not required. The piping between the tanks and the engine is simplified and cost efficient. Additional interfaces on the tanks can be avoided. Existing tank configurations can be used. The second tank can have a smaller volume as the first tank. Particularly, the tank arrangement provides a robust behaviour for different sizes of return flow from the engine to the tank arrangement.

Particularly, the fuel return pipe can be of smaller diameter than the balancing pipe. Advantageously, the dimensions of the fuel return pipe and the balancing pipe can be adapted to each other to maintain a siphon effect during driving. A skilled person will do this based on parameters influencing the behaviour, such as an injection strength of the return fuel in an ejector pump, flow rate of return fuel and the like.

Further, the connection between the fuel return pipe and the balancing pipe can beneficially be designed such that the fuel entering the balancing pipe flows towards the first tank in which the suction pipe (driven by a fuel pump coupled to the engine) is arranged, thereby maintaining the siphon effect during driving. Most favourably, the system can be designed in a way to ensure that all air is removed from the balancing pipe by means of using the return fuel velocity in the return pipe, an ejector device and the check valve. The system is purging itself automatically also after one of the tanks has been emptied completely. As soon as the tank is refilled, the system can start up automatically again.

The direct fuel pipe connection (balancing pipe) between the second and the first tank can be integrated in a return piping provided for removing fuel from the engine to the tank arrangement by integrating the check valve into the piping and arranging the return pipe accordingly with respect to the check valve. The balancing pipe between the tanks can be increased in diameter compared to a usual return pipe.

According to a favourable development of the invention, the return pipe and the balancing pipe can be merged in an ejector device supporting fuel transport from the second tank to the first tank, wherein the return pipe can be attached to a high pressure side and the balancing pipe can be attached to a suction side of the ejector device. Advantageously, the ejector device sucks the fuel out of the second tank. No fuel can flow back from the engine or the first tank to the second tank. The ejector device allows to keep the fuel level in the second tank slightly lower than in the first tank. This allows to empty the second tank completely without introducing air from the second tank into the first tank. The ejector device can be designed accordingly for keeping a desired level difference in the tanks.

According to a further favourable development of the invention, the check valve can be arranged in a balancing pipe leg inside the second tank. This provides a compact arrangement of the valve. Alternatively, the check valve can be arranged in a balancing pipe portion outside the second tank. The skilled person will choose the proper arrangement according to the actual conditions of the tank arrangement.

According to a further favourable development of the invention, the balancing pipe can have a first portion inside the first tank, a second portion inside the second tank and a third portion connected at a first side to a geodetic top portion of the first tank and at a second side to a geodetic top portion of the second tank.

Advantageously, a standard tank geometry can be used with connection ports at the top of the tank vessel.

According to a further favourable development of the invention, the first tank can provide a suction pipe from the first tank to the engine. Preferably, the engine can be supplied with fuel only by the suction pipe connected to the first tank. As suction of fuel from tank to engine occurs only from the first tank, the second tank can be simplified. The first tank is used as master tank whereas the second tank is used as slave tank.

According to a further favourable development of the invention, the first tank can provide a fuel level sensor for sensing the fuel level in the first tank. Favourably, as suction is only made from the first tank, all return fuel from the engine can be guided into the first tank by the check valve.

According to a further favourable development of the invention, each of the first and second tanks can provide individual air pipes supplying each tank with air independent from the other tank. The tank arrangement becomes more robust as an air connection between the two tanks can be removed. Freezing problems caused by condensed water in a common air connection can be avoided. Alternatively, the first and second tanks can be connected with one common air connection. In this case, only one air filter is necessary.

According to a further favourable development of the invention, the second end of the balancing pipe can have a clearance of not more than 4 cm, preferably not more than 2 cm, to the second tank bottom. Thus, the second tank can be virtually completely emptied thus improving the fuel use up of the tank arrangement.

According to a further favourable development of the invention, the return pipe can join the balancing pipe in a valve unit comprising an ejector device supporting fuel transport from the second tank to the first tank, wherein the check valve and the injector valve can be integrated in the valve unit. Advantageously, at least one of the check valve and/or ejector device can provide quick connections with a snap-in function for attaching and detaching the balancing pipe and/or the return pipe.

According to another aspect of the invention, a vehicle is proposed comprising a tank arrangement for supplying fuel to an engine. A balancing pipe between at least a first tank and a second tank is attached to geodetic upper half portions of the first tank and second tank. The tanks can be of different volumes or exhibit the same volume.

According to a favourable development of the invention, the balancing pipe can be arranged within a web of a vehicle frame.

According to a further favourable development of the invention, only the first tank can be supplied with a suction pipe for providing fuel to the engine. A fuel pump can be installed in the first tank.

BRIEF DESCRIPTION OF THE DRAWINGS

The present invention together with the above-mentioned and other objects and advantages may best be understood from the following detailed description of the embodiments, but not restricted to the embodiments, wherein is shown schematically.

DETAILED DESCRIPTION

Figure 1:
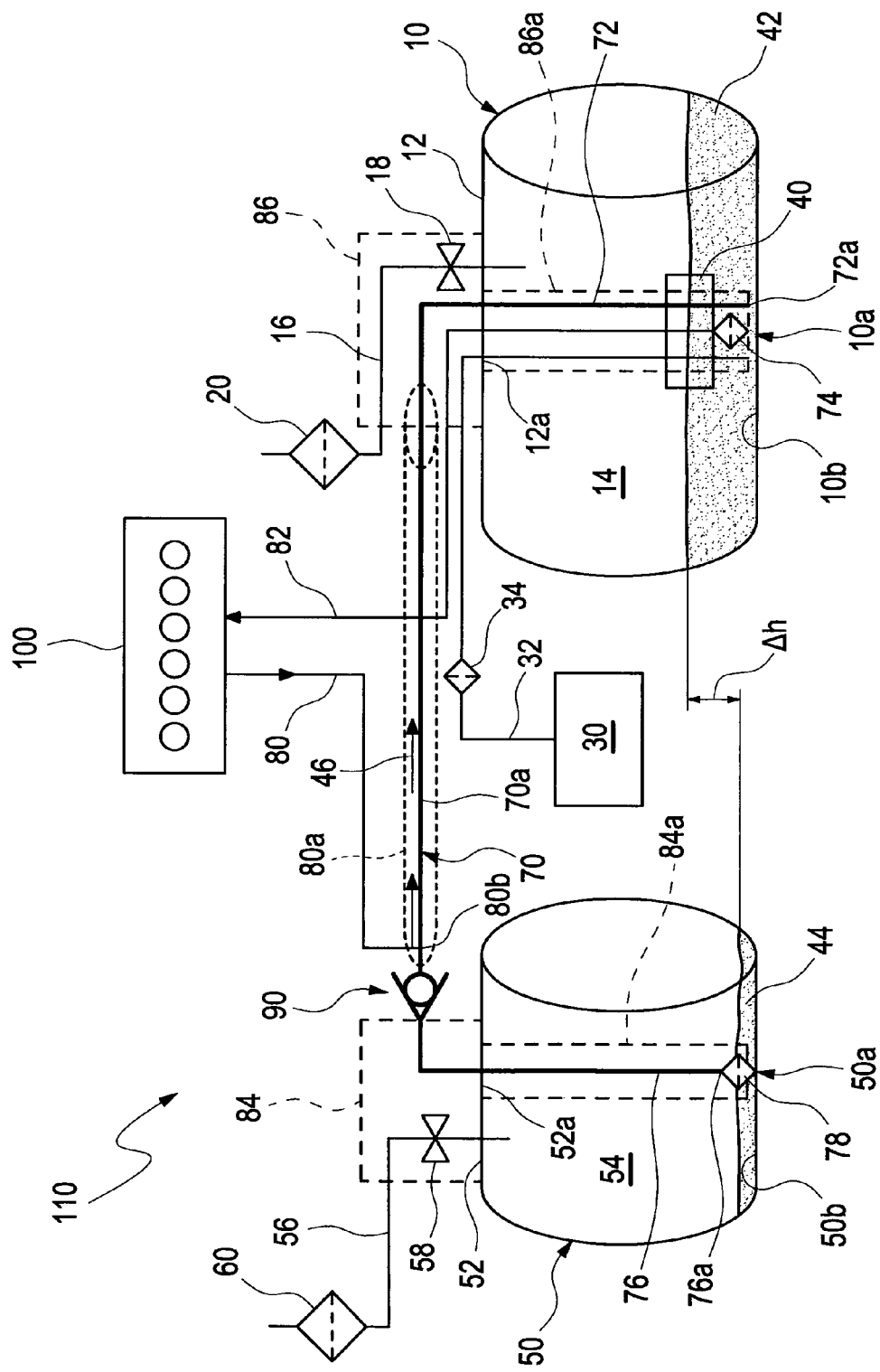
FIG. 1 a sketch of a preferred embodiment of a tank arrangement according to the invention.

In the drawings, equal or similar elements are referred to by equal reference numerals. The drawings are merely schematic representations, not intended to portray specific parameters of the invention. Moreover, the drawings are intended to depict only typical embodiments of the invention and therefore should not be considered as limiting the scope of the invention.

FIG. 1 depicts schematically a sketch of a preferred embodiment of a tank arrangement 110 according to the invention. The tank arrangement 110 is preferably employable in a vehicle 200 (FIG. 4), particularly a truck.

The tank arrangement 110 comprises by way of example a first fuel tank 10 as a master tank with a big volume and a second fuel tank 50 as a slave tank with a smaller volume which are connected by a balancing pipe 70. The balancing pipe 70 extends with one leg 72 into the first tank 10 and with one leg 76 into the second tank 50. Fuel from the second tank 50 is transported through the balancing pipe 70 to the first tank 10.

The first tank 10 is connected to an engine 100 by a suction pipe 82 with a filter 74 at its suction end. A clearance 10a is established above a bottom 10b of the first tank 10 and the suction pipe 82, i.e. the filter 74.

An air connection pipe 16 feeds air to the first tank 10 through an air filter 20 and an air vent valve 18, e.g. a ball valve of the normally-open type. A leg 72 of the balancing pipe 70 extends into the first tank 10. A level of fuel 42 in the inner space 14 of the first tank 10 is sensed by a level sensor 40.

A return pipe 80 feeds surplus fuel from the engine 100 to the first tank 10. Preferably, the balancing pipe 70 is integrated in the return pipe 80, indicated by a pipe portion 80a. Optionally, the outlet of the balancing pipe 70 (or the pipe portion 80a, respectively) in the first tank 10 can be guided away from the suction point of the first tank 10. This can be achieved for instance by an L-shaped end piece where the cross leg of the L-shaped end piece is directed crosswise away from the suction point of the suction pipe 82. The advantage is that if the second tank 50 is emptied and air is sucked in through the balancing pipe 70 the suction pipe 82 does not suck in the air from the balancing pipe 70.

Optionally, a cab heater pipe 32 can be arranged between the first tank 10 and a cab heater pump 30. A filter 34 is arranged in the cab heater pipe 34. The cab heater pump 30 feeds fuel to a heating unit for the vehicle's cab (not shown).

The balancing pipe 70, the return pipe 80, the suction pipe 82 and the air connection pipe 16 are preferably arranged to enter the tank 10 at its top 12. The balancing pipe 70, particularly its leg 72, the return pipe 80, and the suction pipe 82 can be combined in a pipe unit 86a which can be introduced into the first tank 10 through one common feedthrough 12a.

A unit 86 can be coupled to the level sensor 40 and the air vent valve 18, preferably by attaching the unit 86, to the upper portion 12 of the first tank 10 close to the feedthrough 12a. The unit 86 is also called "fuel sender head" and can be coupled to a control unit (not shown) supplying e.g. fuel level data to the control unit.

The second tank 50 is connected to the first tank 10 by the balancing pipe 70. A clearance 50a is established above a bottom 50b of the second tank 50 and the balancing pipe 70, i.e. a filter 78 at the suction end 76a of the leg 76 of the balancing pipe 70. The clearance to the second tank bottom 76b can be 4 cm or less so that the second tank 50 can be virtually completely emptied.

An air connection pipe 56 feeds air to the second tank 50 through an air filter 60 and an air vent valve 58, e.g. a ball valve of the normally-open type. A leg 76 of the balancing pipe 70 extends into the second tank 50. A level sensor for sensing the level of fuel in the inner space 54 of the second tank 50 is not necessary. Preferably, the level of the fuel in the second tank 50 is equal or slightly lower than the fuel level in the first tank 10. This is indicated in the drawing by a level difference δh between the fuel level in the first tank 10 and the fuel level in the second tank 50.

The balancing pipe 70 and the air connection pipe 56 are preferably arranged to enter the second tank 50 at its top 52. The balancing pipe 70, particularly its leg 76, can be arranged in a pipe unit 84a which can be introduced into the second tank 50 through one feedthrough 52a.

A unit 84, again a so called "fuel sender head", can be coupled to the air vent valve 58, preferably by attaching the unit 84 to the upper portion 52 of the second tank 50 close to the feedthrough 52a.

In a portion 70a between the legs 72, 76 of the balancing pipe 70 a check valve 92 is arranged which enables a flow direction 46 from the second tank 50 to the first tank 10 and blocks a flow in the reverse direction. The check valve 92 is arranged upstream of the conjunction 80b of the return pipe 80 to the balancing pipe 70. Preferably, the balancing pipe 70 is integrated in the return pipe 80, indicated by a pipe portion 80a which feeds the fuel returning from the engine 100 and fuel sucked out of the second tank 50 to the first tank 10.

Suction of fuel to the engine 100 is performed with a fuel pump (not shown) preferably arranged at the engine 100. Fuel is directly sucked to the engine 100 only from the first tank 10, where the fuel level is monitored by the level sensor 40. Thus, the tank arrangement is simplified as the second tank 50 does not need a level sensor or a suction pipe to the engine 100.

The tank arrangement 110 is robust during operation. If the air filter 60 of the second tank 50 is clogged, a slight underpressure is built up and emptying the tank 50 is accomplished a little bit harder. If the air filter 20 of the first tank 10 is clogged, the second tank 50 will be emptied faster than usual. When completely emptied, air will flow through the second tank 50 to the first tank 10 and the big tank 10 will be emptied in a normal way.

If the check valve 92 (FIG. 2a-2f) breaks, the valve is always open and provides no effect as long as the balancing pipe 70 is free of air. If air is in the balancing pipe 70, fuel will be returned to the second tank 50, and the fuel level sinks fast in the first tank 10. A driver alert is issued as the level sensor 40 detects the low fuel level.

If the check valve 92 should be clogged, fuel in the second tank 50 is not used up.

If the ejector device 94 should break, all fuel will be returned to the first tank 10. A lesser amount of fuel is sucked out of the second tank 50. The fuel level in the second tank 50 will become higher than in the first tank 10. The second tank 50 cannot be emptied completely. If air enters the leg 76 of the balancing pipe 70 in the second tank 50, e.g. when the unit 84 is removed, then air will stay in the leg 76 and the second tank 50 will not be emptied at all.

Typical inner diameters can be by way of example 9 mm for the fuel suction pipe 82, 6 mm for the fuel return pipe 80 as well as for the air connection pipes 16, 56 and 12 mm for the direct balancing pipe 70 integrated in the return pipe 80. It is to be understood that the dimensions can be chosen differently depending on an actual vehicle in which the tank arrangement 110 is provided.

Figure 2:
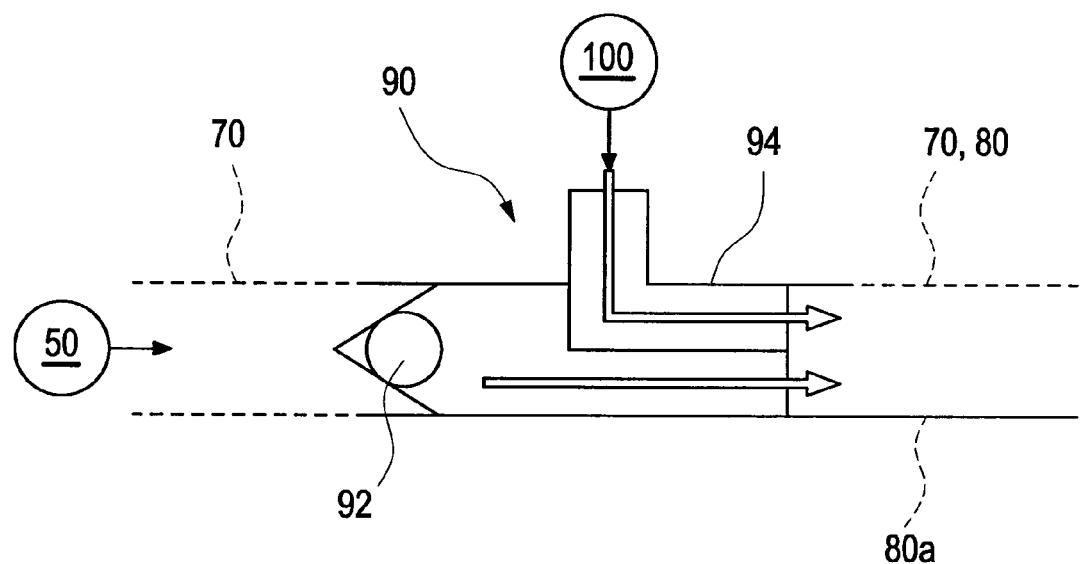
FIG. 2a, 2b a cut through a preferred valve unit with a check valve and a ejector device (FIG. 2a), a preferred valve unit displaying quick connectors (FIG. 2b), an alternative kind of a check valve of the butterfly type (FIG. 2c), an alternative kind of a check valve of the mushroom type (FIG. 2d) and an alternative kind of a check valve of the mouth type (FIG. 2e)
Figure 2:
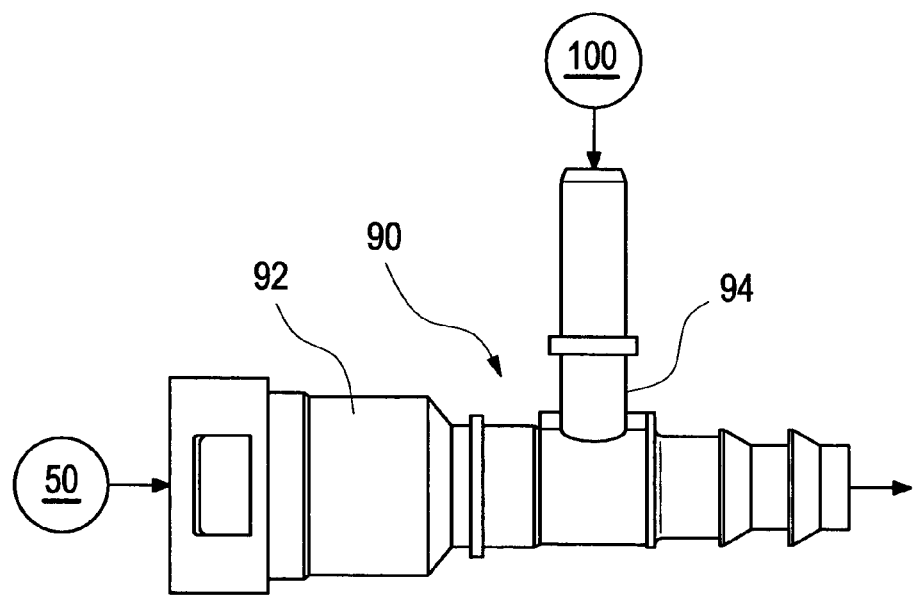
Figure 2:
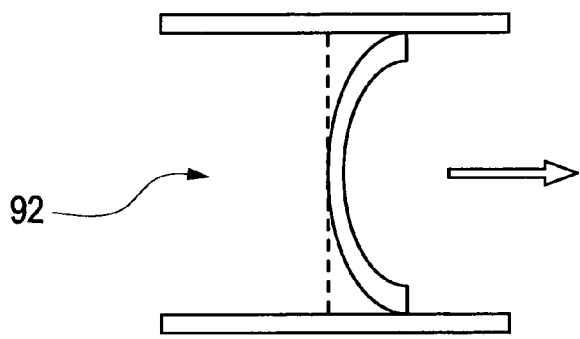
Figure 2:
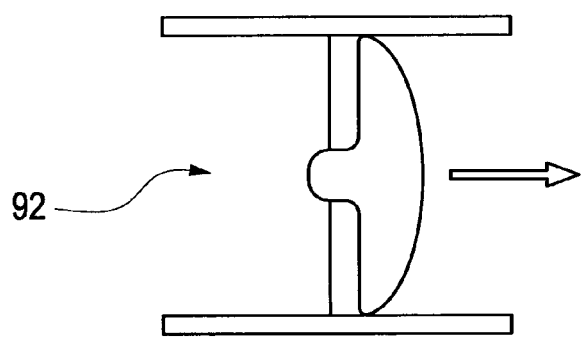
Figure 2:
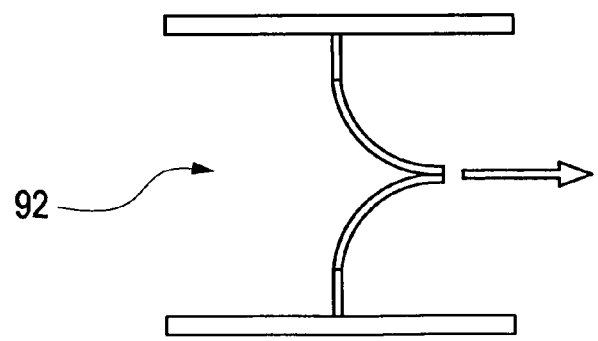

FIGS. 2a and 2b illustrate a preferred valve unit 90 by a cut through the preferred valve unit 90 and a side view of the valve unit 90.

The return pipe 80 joins the balancing pipe 70 in operational interaction with an ejector device 94 in a valve unit 90. A flow of return fuel returning from the engine 100 to the ejector device 94 sucks fuel from the second tank 50 into the first tank 10. Upstream of the ejector device port for the return pipe 80 a check valve 92 is arranged which enables flow from the second tank 50 to the first tank 10 and blocks a flow in the reverse direction. The ejector device 94 can by way of example be designed as a Venturi valve or the like.

Preferably, quick fittings can be provided at the pipe ports for an easy connection of the balancing pipe 70 and the return pipe 80 to the valve unit 90. Particularly, the quick fittings provide a snap in function as indicated in FIG. 2b which allows easy plugging in and releasing of the pipes.

The check valve 92 has a low opening pressure, e.g. corresponding to 100 mm fuel height difference. The check valve 92 can be a ball type valve as illustrated in FIG. 2a. Alternatively, the check valve 92 can be a butterfly type valve as illustrated in FIG. 2c. Alternatively, the check valve 92 can be a mushroom type valve as illustrated in FIG. 2d. Alternatively, the check valve 92 can be a mouth type valve as illustrated in FIG. 2e. The allowed flow direction is indicated as a bold arrow.

Figure 3:
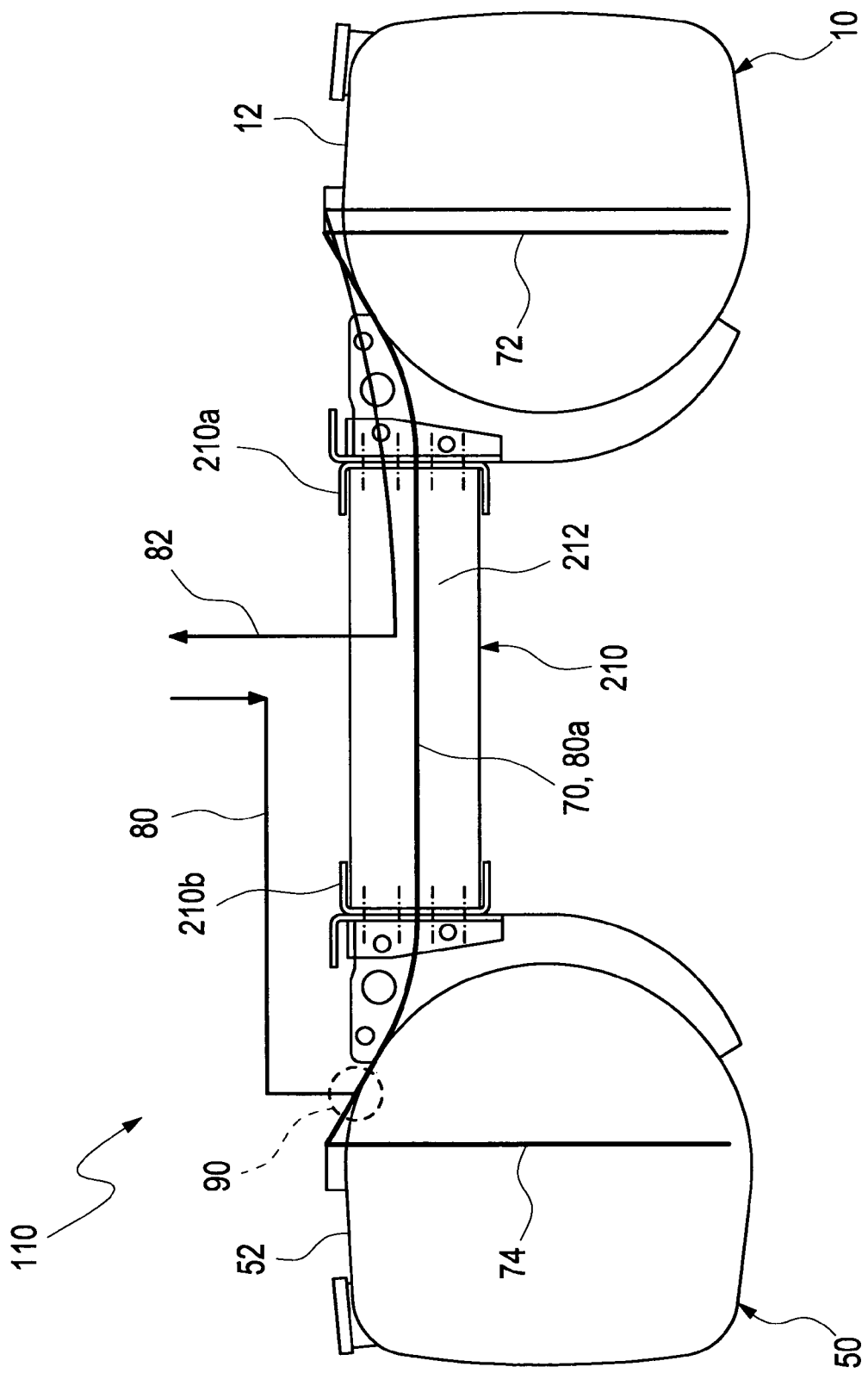
FIG. 3 preferred arrangement of a balancing pipe between two tanks according to the invention.
Figure 4:
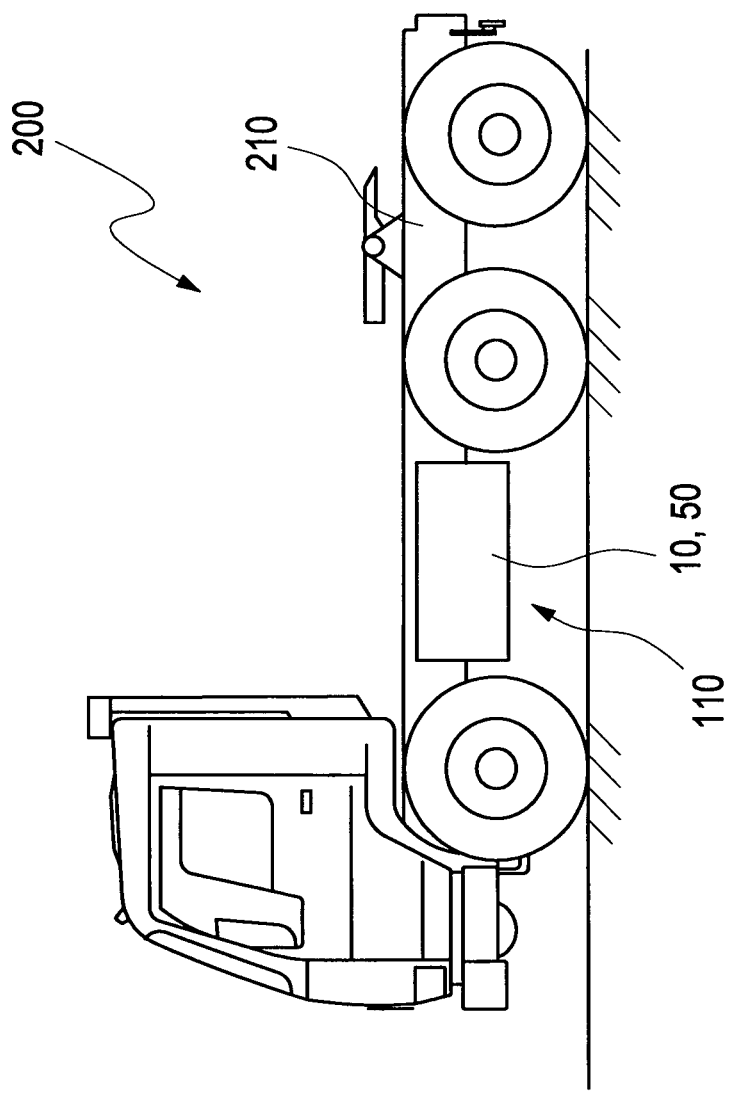
FIG. 4 a preferred vehicle comprising a tank arrangement according to the invention.

Referring now to FIG. 3 and FIG. 4, a preferred arrangement of a tank arrangement 110 on a vehicle is shown. The tank arrangement 110 comprising e.g. two tanks 10, 50 connected by a balancing pipe 70 according to the invention is depicted in FIG. 3. An example embodiment of the vehicle 200 is shown in FIG. 4.

The tanks 10, 50 are each attached to one longitudinal frame beam 210a, 210b at each side of a vehicle frame 210. The middle portion of the balancing pipe 70 combined with the return pipe 80 is arranged within a web 212 between the longitudinal beams 210a, 210b of the vehicle. The valve unit 90 can be arranged inside or outside the second tank 50.

Figure 5:
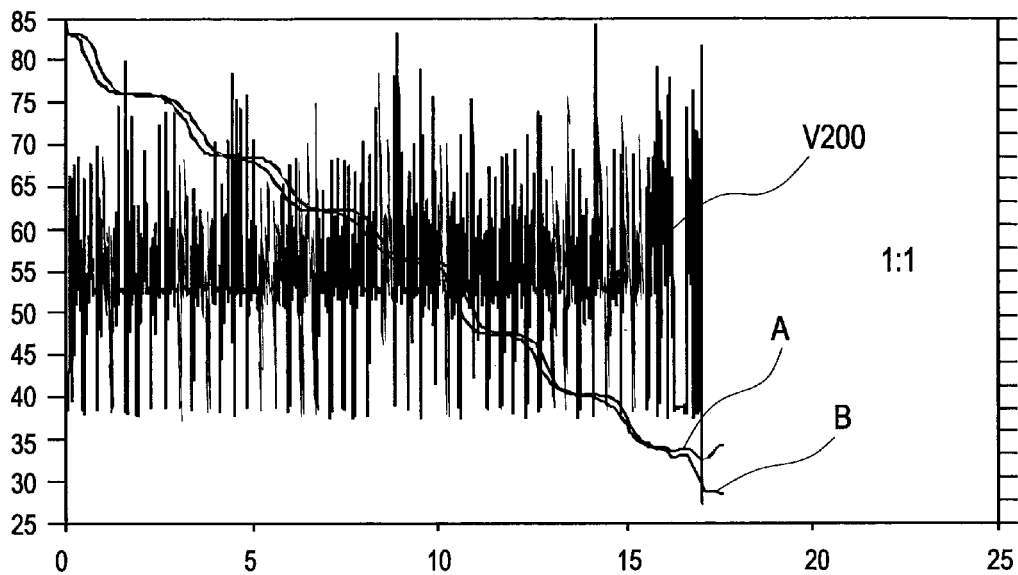
FIG. 5a, 5b test results with different tank volume combinations with tanks of equal volume (FIG. 5a) and tanks with dissimilar volumes (FIG. 5b).
Figure 5:
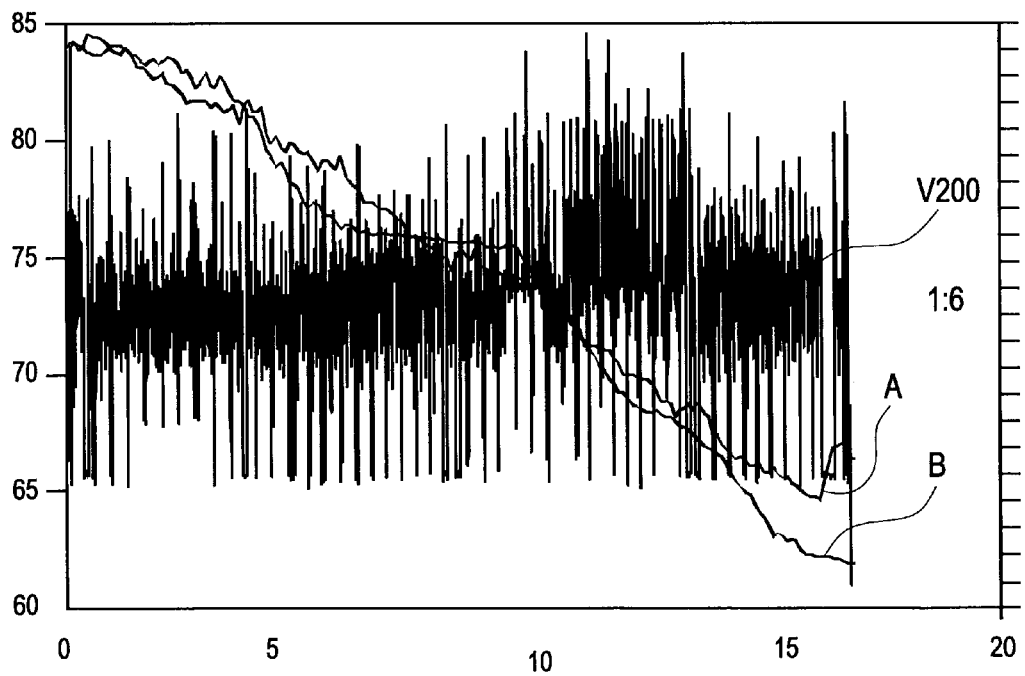

Test results with different tank volume combinations are presented in FIGS. 5a and 5b, featuring a dual tank arrangement with tanks of equal volume in FIG. 5a and with tanks with dissimilar volumes in FIG. 5b. The dual tank arrangement is embodied as described in the preceding drawings.

As suction of fuel to the engine 100 (FIG. 1) is performed only from the first tank 10, the levelling of the fuel levels in both tanks 10, 50 (FIG. 1), where the fuel level is monitored by the level sensor 40. Thus, the tank arrangement is simplified as the second tank 50 does not need a level sensor or a suction pipe to the engine 100.

The noisy-appearing signal V200 represents the engine speed, and stepwise descending signals A and B represent the fuel level balancing in one of the tanks (signal A) and the other of the tanks (signal B) as a function of time.

In FIG. 5a, the tank volumes are equal and by way of example comprise 150 litre fuel each. The fuel volume in the tanks drops from 85% at the start of the test phase to about 30% at the end of the test phase, wherein signal B follows nicely signal A.

In FIG. 5b, the tank volumes are dissimilar and by way of example comprise 150 litre fuel in a small tank and 870 litre fuel in a big tank of the preferred dual tank arrangement. The fuel volume in the tanks drops from 85% at the start of the test phase to about 65% during the test phase, wherein signal B follows nicely signal A.

The invention provides a tank arrangement with at least two tanks which permits a complete emptying of the one or more slave tanks which feed fuel to a master tank, while fuel is transferred from the master tank to an engine. The arrangement provides an improved fuel use up and permits a virtually complete emptying of the one or more slave tanks. The suction point of the balancing pipe to the master tank can be lowered to the tank bottom. No specific refilling order of the tanks is required. Particularly, it is possible to drive with the master tank filled and empty slave tanks. The routing of the pipes is simplified and cost efficient.

The invention claimed is:

1. A tank arrangement for a vehicle, comprising
    a first fuel tank,
    a second fuel tank,
    a balancing pipe connecting the first fuel tank and the second fuel tank,
    a suction pipe for feeding fuel to an engine,
    a return pipe for feeding fuel from the engine to at least one of the first and second fuel tanks,
    the balancing pipe comprising a first leg to supply fuel to the first tank and a second leg to suck fuel from the second tank, and
    a check valve arranged upstream of the return pipe in the balancing pipe between the at first and second tanks allowing a flow direction from the second tank to the first tank and blocking a flow in the reverse direction,
    wherein the return pipe and the balancing pipe are merged at an ejector device supporting fuel transport from the second tank to the first tank, wherein the return pipe is attached to a high pressure side and the balancing pipe is attached to a suction side of the ejector device.

2. The tank arrangement according to claim 1, wherein the check valve is arranged in a balancing pipe leg inside the second tank.

3. The tank arrangement according to claim 1, wherein the check valve is arranged in a balancing pipe portion outside the second tank.

4. The tank arrangement according to claim 1, wherein the balancing pipe has the first leg inside the first tank, the second leg inside the second tank and a third portion connected at its first side to a upper half portion of the first tank and at its second side to a geodetic upper half portion of the second tank.

5. The tank arrangement according to claim 1, wherein the first tank provides a suction pipe from the first tank to the engine.

6. The tank arrangement according to claim 5, wherein the engine is supplied with fuel only by the suction pipe connected to the first tank 7. The tank arrangement according, to claim 1, wherein the first tank provides a fuel level sensor for sensing the fuel level in the first tank.

8. The tank arrangement according to claim 1, wherein the first tank has a larger volume than the second tank.

9. The tank arrangement according to claim 1, wherein each of the first and second tanks provide individual air pipes supplying each tank with air independent from the other tank.

10. The tank arrangement according to claim 1, wherein the second end of the balancing pipe has a clearance of not more than 4 cm, to the second tank bottom.

11. The tank arrangement according to claim 1, wherein the return pipe joins the balancing pipe in an valve unit comprising an ejector device supporting fuel transport from the second tank to the first tank, wherein the check valve and the injector valve are integrated in the valve unit.

12. The tank arrangement according to claim 11, wherein at least one of the check valve and/or ejector device provide quick connections with a snap-in function for attaching and detaching the balancing pipe and/or the return pipe.

13. A vehicle comprising a tank arrangement according to claim 1 for supplying fuel to an engine, wherein the balancing pipe between the first tank and the second tank is attached to geodetic upper half portions of the first tank and second tank.

14. The vehicle according to claim 13, wherein to middle portion of the balancing pipe is arranged within a web of a vehicle frame.

15. The vehicle according to claim 13, wherein only the first tank is supplied with a suction pipe for providing fuel to the engine.

* * * * *

UNITED STATES PATENT AND TRADEMARK OFFICE
CERTIFICATE OF CORRECTION

PATENT NO. : 8,579,332 B2  
APPLICATION NO. : 13/139301  
DATED : November 12, 2013  
INVENTOR(S) : Sonderegger et al.

It is certified that error appears in the above-identified patent and that said Letters Patent is hereby corrected as shown below:

On the title page, item [73] Assignee "Volvo Lastvagner AB" should read --Volvo Lastvagnar AB--.

Signed and Sealed this  
Twenty-fourth Day of December, 2013

Margaret A. Focarino  
*Commissioner for Patents of the United States Patent and Trademark Office*